Patented Aug. 10, 1954

2,686,172

UNITED STATES PATENT OFFICE 2,686,172

TOUGH, STRONG, AND EASILY PROCESSED VINYL CHLORIDE INTERPOLYMERS CONTAINING FREE SIDE-CHAIN HYDROXYL GROUPS

Robert J. Wolf, Cleveland, Ohio, assignor to The B. F. Goodrich Company, New York, N. Y., a corporation of New York No Drawing. Application May 22, 1951,
Serial No. 227,732

4 Claims. (Cl. 260—80.5)

The present invention relates generally to tough, strong, easily-processable vinyl chloride interpolymers and to the production of sheets, films and coatings therefrom.

I have discovered that thermoplastic, easily processed yet tough and strong vinyl chloride interpolymers are produced by a method involving the polymerization of monomeric mixtures containing three essential types of monomers, each in particular proportions, one being vinyl chloride, another being an alkyl acrylate and the third of which is a hydroxy-alkyl ester of acrylic acid. The resultant interpolymers contain free side-chain hydroxyl groups and are characterized by their ability to be processed or shaped at moderate temperatures of 150 to 250° F. However, they possess high tensile strength at both ordinary and elevated temperatures and, especially when formed into a homogeneous coherent mass such as a film, sheet or coating they are remarkably tough and strong, free from tack and capable of retaining their flexibility at low temperatures.

Unlike most comonomers the hydroxyl-containing acrylates of the specified class when incorporated into a vinyl chloride alkyl acrylate copolymer have a very pronounced strengthening or toughening effect, even when utilized in amounts as small as 1 to 2% or less of the total monomeric mixture. This strengthening effect is quite unique because it is achieved without impairment of processing characteristics, low temperature flexibility or any other desirable plastic property possessed by a vinyl chloride acrylate copolymer of corresponding composition. It is not fully understood but it is believed that the hydroxyl-containing acrylate ester group in the polymer functions as the locus of hydrogen "bridging" or bonding established between adjacent polymer chains. The bond produced appears to be easily disrupted by mastication and/or heating only to be re-established upon cooling. This "hydrogen bonding" between adjacent polymer chains is probably not fully established until the interpolymer has been compacted by heat or subjected to work in the stretched out condition and the polymer chains brought in close proximity and somewhat in axial alignment as is obtained by masticating, extruding, calendering and other fusing, homogenizing and shaping operations. Consequently, the fullest strength and toughness of the interpolymers of this invention are realized when the interpolymer containing side-chain hydroxyls is converted into thin films, sheets, tubes, coatings, and other thin coherent, homogeneous integuments having one dimension less than about ¼ inch, and preferably less than about 25 mils.

The relative proportions of monomers which are employed in the production of my interpolymers are somewhat critical, since the desired properties are not secured with these monomers in any proportion, but may vary within certain limits. In the monomeric mixture I have found it necessary to employ from 35 to 90% by weight of vinyl chloride, from 5 to 65% by weight of the alkyl acrylate and from 0.2 to 25% by weight of one or more than one of the hydroxyl-containing acrylates with at least 90% by weight of the monomeric mixture being made up of these three ingredients. Other monomeric materials such as vinylidene chloride, vinyl acetate, vinyl benzoate, diethyl fumarate, acrylonitrile, styrene, lower alkyl acrylates such as methyl and ethyl acrylate and others are, if desired, utilizable to the extent of 10% by weight of the total monomeric mixture but is preferred that only monomeric material of the three specified types be present. Particularly valuable are those interpolymers made from monomeric mixtures containing from 40 to 85% by weight of vinyl chloride, from 10 to 50% by weight of the alkyl acrylate, and from 0.5 to 10% by weight of the hydroxyl-containing acrylic ester monomer. In the production of interpolymers within the monomeric proportions defined herein it is of course intended that if a maximum amount of one of the monomers is employed by implication less than maximum amounts of at least one of the others must be employed.

Any of the alkyl acrylates are utilizable in the production of interpolymers according to this invention, the choice of them depending on properties desired in the interpolymer. Suitable acrylates are methyl acrylate, ethyl acrylate, propyl acrylate, n-butyl acrylate, n-amyl acrylate, n-hexyl acrylate, isohexyl acrylates, n-heptyl acrylate, isoheptyl acrylates, capryl acrylate, (1-methylheptyl acrylate), n-octyl acrylate, 2-ethylhexyl acrylate, isooctyl acrylates such as 6-methylheptyl acrylate, n-nonyl acrylate, isononyl acrylates such as 3,5,5-trimethylhexyl acrylate, n-decyl acrylate, lauryl acrylate and others.

I have found that interpolymers are produced from higher alkyl acrylates in which the alkyl group contains from 4 to 10 carbon atoms which are tough and strong yet which are easily processed without plasticizer at moderate temperatures. Illustrative higher alkyl acrylates within the above class utilizable in this invention include n-butyl acrylate, n-amyl acrylate, n-hexyl acrylate, isohexyl acrylates, isoheptyl acrylate, n-heptyl acrylate, capryl acrylate (1-methyl-heptyl acrylate), n-octyl acrylate, isooctyl acrylates such as 6-methylheptyl acrylate, n-nonyl acrylate, isononyl acrylates such as 3,5,5-trimethylhexyl acrylate, n-decyl acrylate and others.

It is greatly preferred to employ higher alkyl acrylates in which the alkyl group contains a total of 8 to 10 carbon atoms and possesses a carbon chain of 6 to 10 atoms. Compounds within this preferred class which produce tough, strong interpolymers of outstanding processability are 6-methylheptyl acrylate, 3,5,5-trimethylhexyl acrylate, 2-ethylhexyl acrylate, capryl acrylate (1-methylheptyl acrylate), n-octyl acrylate and others. The acrylate of this class has been found to impart the greatest ease of processing to the interpolymers of this invention and the most efficient in this respect is n-octyl acrylate.

The hydroxy-alkyl esters of acrylic acid which are utilized in the production of the interpolymers of this invention contain the polymerizable vinyl group in the acid residue and also contain one or more hydroxyl groups attached to the alcohol residue. The hydroxyl groups are herein termed "side-chain" because they are attached to the alcohol residue rather than to either of the carbon atoms of the vinyl group and therefore are present in the polymer attached to sidechain carbon atoms rather than to chain carbon atoms. Illustrative hydroxy alkyl acrylates include 2 - hydroxyethyl acrylate, 1 - chloro - 2-hydroxyethyl acrylate, 3-hydroxy-propyl acrylate, 2,3-dihydroxy-propyl acrylate (glyceryl acrylate), 2-methoxy-3-hydroxy-propyl acrylate, 2-hydroxy-butyl acrylate, 3-hydroxyl-butyl acrylate, 3,4-dihydroxy-butyl acrylate, 2-methoxy-3,4-dihydroxy-butyl acrylate, 5-hydroxy-amyl acrylate, 6-hydroxy-hexyl acrylate, 2-ethyl-6-hydroxy-hexyl acrylate, 7-hydroxy-heptyl acrylate, 1-methyl-7-hydroxy-heptyl acrylate, 8-hydroxy-octyl acrylate, 3,5,5-trimethyl-6-hydroxy-hexyl acrylate, 10-hydroxy-decyl acrylate and others.

It is greatly preferred to utilize the hydroxy-substituted acrylates having alkyl groups of intermediate chain length. I have found that the hydroxy-alkyl acrylates disclosed above which contain from 2 to 10 carbon atoms and which possess a carbon chain from 2 to 8 atoms in length produce tougher and more easily processed interpolymers, with the hydroxy-butyl acrylates being most proficient in this respect.

The polymerization to form my new interpolymers may be carried out in any conventional manner although polymerization in aqueous emulsion, which may or may not contain an added emulsifier, is of course essential when a latex of the interpolymers is the desired end-product. In addition to this preferred method, the mixture of monomers may be polymerized in an aqueous medium containing a colloidal suspension agent such as gelatin, bentonite clay, polyvinyl alcohol, polyacrylic acid, water-soluble phenol-aldehyde and urea-aldehyde condensation products and others, the latter method being an aqueous suspension method known as the "pearl" type method and results in a fine uniform granular polymer. In addition to the latter methods the polymerization of the monomeric mixture may be accomplished in solution in a suitable solvent in which case the interpolymer is obtained either as a granular precipitate or as a solution in the solvent, depending on the choice of solvents. The polymerization may also be performed in the absence of a solvent or diluent to obtain a solid mass of the interpolymer. Polymerization in an aqueous emulsion or dispersion to obtain either a polymeric dispersion or latex or a granular precipitate is greatly preferred. Suitable emulsifiers include the synthetic anionic emulsifiers such as the hymolal sulfates and sulfonates, the cationic emulsifiers such as the salts of organic bases containing long carbon chains and the so-called non-ionic emulsifiers such as the polyether alcohols prepared by condensing ethylene oxide with higher alcohols, and others.

Whatever method of polymerization is employed a catalyst will generally be necessary. The catalyst may be any of those generally employed for the polymerization of vinyl and vinylidene compounds. Actinic radiation may be employed, as well as the various peroxygen compounds such as hydrogen peroxide, benzoyl peroxide, o,o'-dichlorobenzoyl peroxide, caproyl peroxide, caprylyl peroxide, pelargonyl peroxide, cumene hydroperoxide, tertitary butyl hydroperoxide, 1-hydroxycyclohexyl hydroperoxide, tertiary butyl diperphthalate, tertiary butyl perbenzoate, sodium, potassium and ammonium persulfate, sodium perborate, sodium percarbonate and others.

While the polymerization may be carried out in the presence of air, the rate of reaction is ordinarily faster in the absence of oxygen and hence polymerization in an evacuated vessel or under an inert atmosphere is preferred. The temperature at which the polymerization is carried out is not critical, it may be varied widely from $-30°$ to $100°$ C. or higher, though best results are generally obtained at a temperature of about $0°$ C. to about $70°$ C.

The polymers obtained may be subjected to mastication, calendering, extruding or other shaping operations performed in a conventional way at temperatures of from 125 to $400°$ F., more preferably $150°$ to $250°$ F. The interpolymers of this invention show their greatest toughness and strength in the form of sheets, etc. below ¼ inch in thickness and preferably in thin films and coatings below about 25 mils in thickness.

The preparation of the interpolymers of this invention, their properties, and representative uses thereof will be more clearly described in the following specific examples which are intended merely as illustrations of the nature of my invention and not as limitations on the scope thereof.

*Example 1*

A tripolymer is prepared by polymerizing a mixture of monomeric materials in a reaction mixture having the composition:

| | Parts/weight |
|---|---|
| Vinyl chloride | 60.0 |
| 2-ethylhexyl acrylate | 30.0 |
| 3-hydroxybutyl acrylate | 10.0 |
| Emulsifier [1] | 4.0 |
| Potassium persulfate | 0.3 |
| Water | 94.5 |

[1] A sodium sulfonated paraffin oil known as "MP-189S" or "Alkanol DW."

The polymerization reaction is substantially complete in 20 hours at $50°$ C. at which time the pH of the medium is 3.5. The solid tripolymer is isolated by freezing the latex and the coagulum washed and dried. A small sample of granular coagulum is press-molded without plasticizer to form a smooth and tough disk of less than 0.25 inch in thickness which is tack free and completely fused. The tripolymer mills very readily at 200° F. and shows good body. The tripolymer has a tensile strength of about 3,000 lbs./sq. in. and at 125° F. is considerably stronger than a corresponding copolymer made without the hydroxybutyl acrylate.

In a similar fashion tripolymers are produced by the polymerization of mixtures containing 55% by weight of vinyl chloride, 40% by weight of n-octyl acrylate, isooctyl acrylate, or 3,5,5-trimethylhexyl acrylate (isononyl acrylate) and 5% by weight of 3-hydroxybutyl acrylate. The n-octyl acrylate tripolymer is slightly softer and less tough than that of Example 1 above while the isononyl acrylate tripolymer is slightly harder. All, however, are easy to mill without plasticizer to produce tough-feeling, smooth milled sheets of good body.

Example 2

A tripolymer made in the medium of Example 1 from a monomeric mixture consisting of 64% by weight of vinyl chloride, 34% by weight of 2-ethylhexyl acrylate and 2% by weight of 3-hydroxybutyl acrylate mills smoothly and shows good body at 150° F. forming a tack-free tough and strong sheet.

The unplasticized tripolymers of Examples 1 and 2 are admirably suited to the production of thin calendered sheets and coatings of from 5 to 10 mils in thickness. When heated for 7 days at 100° C. the films are not appreciably discolored and suffer no loss in weight and very little change in tensile strength or elongation. By contrast films of plasticized polyvinyl chloride or plasticized vinyl chloride alkyl acrylate copolymers suffer a loss in weight and permanent increase in tensile strength and substantial decrease in elongation when so heated.

Example 3

Tripolymers are produced by the polymerization in an acidic aqueous suspension of monomeric mixtures comprising 70% by weight of vinyl chloride, 20% by weight of isooctyl acrylate or isononyl acrylate (3,5,5-trimethylhexyl acrylate) and 10% by weight of either 3-hydroxybutyl acrylate, 2-hydroxyethyl acrylate, or 8-hydroxyoctyl acrylate. The tripolymers are easily processed but are tougher than any of those of Examples 1 and 2.

Example 4

A tripolymer produced from a mixture consisting of 64% vinyl chloride, 35% by weight of 2-ethylhexyl acrylate, and 1% by weight of 3-hydroxybutyl acrylate is considerably tougher than a 65/35 vinyl chloride 2-ethylhexyl acrylate copolymer yet is easily milled without plasticizer at 150° F. showing good body and producing a smooth clear, tack-free sheet.

Example 5

Still other tripolymers are obtained by varying the proportions of the various monomeric materials. A tripolymer made utilizing a monomeric mixture consisting of 85% by weight of vinyl chloride, 14% by weight of n-octyl acrylate and 1% by weight of 3-hydroxybutyl acrylate is a material which could be milled without plasticizer at temperatures of about 200° F., yet is hard and rigid and is therefore adapted to the production of hard rigid rods and tubes. A tripolymer obtained by the polymerization of a monomeric mixture consisting of 35% vinyl chloride, 50% of 2-ethylhexyl acrylate, and 15% of 3-hydroxybutyl acrylate is a soft-tack-free and very flexible material quite unlike the very soft and sticky copolymers made from a mixture of 35 to 45% vinyl chloride and 55 to 65% of 2-ethylhexyl acrylate.

Interpolymers very similar to those described in Examples 1 to 5 are obtained when up to 10 parts of acrylonitrile, vinylidene chloride, vinyl acetate, or methyl acrylate are polymerized along with a mixture containing 55 parts vinyl chloride, 40 parts of n-octyl acrylate, and 5 parts of 3-hydroxybutyl acrylate. Generally, however, the use of additional monomers does not result in additional valuable properties so that it is preferred to produce tripolymers from monomeric mixtures containing only the three specified types of monomers.

While the invention has been described with particular reference to certain preferred embodiments thereof, it is possible to make variations and modifications therein without departing from the spirit and scope of the invention as defined in the appended claims.

I claim:

1. A strong, easily-processable, thermoplastic tripolymer made by polymerizing a mixture of monomeric materials consisting of vinyl chloride, an alkyl ester of acrylic acid in which the alkyl group contains a total of 8 to 10 carbon atoms and possesses a carbon chain of 6 to 10 atoms and a hydroxy-alkyl ester of acrylic acid in which the alkyl group contains from 2 to 10 carbon atoms and possesses a carbon chain of 2 to 8 atoms, the said hydroxy-alkyl ester being present in an amount from about 0.5 to 10% by weight and the said vinyl chloride being present in an amount by weight about twice that of the said alkyl ester of acrylic acid, said tripolymer being characterized by being easily processable at temperatures of 125 to 400° F. and after being processed at such temperature, by possessing a tensile strength considerably higher than that of a two-component copolymer of vinyl chloride and the said alkyl acrylate in the same relative proportions.

2. The composition of claim 1 in which the alkyl ester of acrylic acid is 2-ethylhexyl acrylate.

3. The composition of claim 1 in which the hydroxyalkyl ester of acrylic acid is a hydroxybutyl acrylate.

4. A strong, easily-processable, thermoplastic tripolymer made by polymerizing a monomeric mixture consisting of about 60% by weight of vinyl chloride, about 30% by weight of 2-ethylhexyl acrylate and about 10% by weight of 3-hydroxybutyl acrylate, said tripolymer being characterized by being easily processable at temperature of 125 to 400° F. into thin films and sheets and by possessing, after being processed at such temperature, a tensile strength of the order of 3,000 lbs./sq. in.

References Cited in the file of this patent

UNITED STATES PATENTS

| Number | Name | Date |
|---|---|---|
| 2,412,475 | Semegen | Dec. 10, 1946 |